March 30, 1965   F. G. BLACKLER ETAL   3,176,181
APERTURED COAXIAL TUBE QUADRIPOLE LENS
Filed Oct. 31, 1960   3 Sheets-Sheet 3

INVENTOR
FRANCIS G. BLACKLER
DEREK R. SKOYLES
BY
AGENT

United States Patent Office 3,176,181
Patented Mar. 30, 1965

3,176,181
APERTURED COAXIAL TUBE QUADRIPOLE LENS
Francis Geoffrey Blackler, Wallington, and Derek Robert Skoyles, Reigate, England, assignors to North American Philips Company, Inc., New York, N.Y., a corporation of Delaware
Filed Oct. 31, 1960, Ser. No. 65,992
Claims priority, application Great Britain, Nov. 25, 1959, 40,011/59
11 Claims. (Cl. 315—3)

This invention relates to electron lenses.

There are cathode-ray tube applications where converging lenses are required to have a useful aperture equal to a large fraction of the overall cross-section of the lens structure. These requirements can be met by conventional magnetic lenses, but they tend to be expensive and critical and to have excessive length in the axial direction. The problem can also be met by electrostatic types of lenses but various disadvantages arise. Thus, in some types employing ring electrodes, e.g. Einsel lenses, excessive potentials have to be applied and/or excessive axial length devoted to the structure in order to permit the utilization of a wide aperture. Other types rely on the use of a wire mesh which is disadvantageous inasmuch as it decreases the electron transmission of the lenses and creates secondary emission and other problems.

A high degree of convergence with corrected aberrations can be obtained more readily with a large aperture by using two quadripole lenses arranged in quadrature, each lens having a converging action in one plane and a concomitant diverging action in the orthogonal plane, said planes being axial planes, i.e. planes containing the optical axis of the lens. In cases where astigmatic focusing of the beam is required, this arrangement is even more advantageous since focusing can be controlled independently in two orthogonal axial planes.

In other applications, a single quadripole lens is required for its diverging action.

It is well known that the ideal field configuration for a quadripole lens is one which conforms to an equilateral rectangular hyperbolic pattern in cross-section. For devices other than cathode-ray tubes it has been proposed that an approximation of such pattern be obtained with an electrostatic lens structure comprising coaxial inner and outer tubes with a pair of plain rectangular windows formed in opposite regions of the inner tube. When a potential difference is set up between the inner and outer tubes, the resulting lens field has a satisfactory configuration in a small region close to the optical axis, but in the major part of the cross-sectional area of the inner tube the aberrations are too severe for precision applications such as beam focusing in a cathode-ray display tube. It is an object of the present invention to provide an improved electrostatic quadripole lens structure which is capable of providing a useful aperture of larger diameter for given overall dimensions.

According to the present invention, a cathode-ray tube includes a quadripole electrostatic electron lens structure comprising a tubular conductive inner electrode having a pair of windows formed in opposite regions thereof. These windows are symmetrically disposed on either side of an axial plane while being each divided symmetrically into two equal parts by an axial plane normal to said plane. The windows each subtend an angle greater than 90° at the optical axis, and the inner electrode has conductive extensions into the window areas along axes parallel or substantially parallel to the optical axis and/or auxiliary openings in the parts of the inner electrode extending between the windows. The extensions and/or auxiliary openings are provided for correction purposes and are symmetrical with respect to both of the said planes of symmetry. The lens structure also comprises a conductive outer electrode having operative conductive elements which cover both windows and any auxiliary openings.

When appropriate potentials are applied to the electrode systems, such a lens is convergent in one of said axial planes of symmetry and divergent in the other, and these planes will be referred to, for convenience, as the X and Y planes.

The above expression "covering" is used to signify that the outer electrode extends at least over an area having the same axial length and position as each window and a cross-section subtending (at the axis) the same angle as that subtended by the window. The same criterion applies to any auxiliary opening that may be present. These are minimum requirements based on the fact that the main lens field (and similarly the correcting action of any auxiliary opening) depends on inward penetration of the field set up between the two electrodes. Thus the outer electrodes may comprise separate electrode elements of minimum area which (in use) are connected together so that equal, or related, potentials are applied to all parts. However, the field can be rendered more independent of outside influences (e.g. wall charges) by increasing such electrode elements beyond the stated minimum areas so that each overlaps the respective window or auxiliary opening. This may be taken to the limit so that the outer electrode becomes one continuous tubular surface.

The provision of conductive extensions reduces the field penetration so that, for a given focal length and structural cross-section, the axial length of the lens must be increased or the potential difference between the electrodes must be raised. If (as is preferred) the electrodes are already so close to each other that their potential difference cannot safely be raised, then it is the axial length of the windows which must be increased to maintain the lens strength.

The inner electrode may be a single continuous conductive element. Alternatively, it is possible to use an inner electrode which is subdivided into separate parts. Thus, for example, the inner electrode may comprise two equal halves divided longitudinally along an axial plane so as to permit an ancillary potential difference to be applied between the two halves in addition to any main potential difference set up between the inner and outer electrodes. Such ancillary potential difference may be an A.C. voltage used for scanning the beam or it may be a D.C. voltage used for beam centering purposes.

As aforesaid, the windows each subtend at the optical axis an angle greater than 90° and, for a circular cross-section, the actual optimum amount depends on the diameter ratio of outer to inner electrodes. This feature assists in providing a substantially hyperbolic field configuration over a large cross-sectional area in a manner which will be explained.

The outer electrode may, as aforesaid, comprise separate elements in which case, when in use, connecting means are provided between the operative elements of the outer electrode, their function being to maintain said elements at equal (or appropriately related) potentials, and therefore they may be constituted by conductors such as wire or by circuit means. As in the case of the inner electrode, the outer electrode may comprise two equal halves divided longitudinally along an axial plane so as to permit an ancillary potential difference to be applied between the two halves in addition to any main potential difference set up between the inner and outer electrodes. Such ancillary potential difference may be an A.C. voltage used for scanning the beam or it may be a D.C. voltage used for beam centering purposes.

With plain rectangular windows, even when modified to subtend an angle of more than 90°, it is very difficult to obtain an accurate approximation of the ideal hyperbolic field except in a relatively small central region. It is for this reason that the conductive extensions and/or auxiliary openings are provided in lenses according to the invention. If correction of the field is required solely or mainly in one of the planes of symmetry, then it may be sufficient to use only extensions or only auxiliary openings, a typical case being one in which the beam has a markedly oval cross-section. However, whenever high accuracy is required in both the X and Y planes and/or the beam has a circular or substantially circular section, it is desirable to employ both conductive extensions and auxiliary openings so as to correct the field to a substantially equal extent in both planes of symmetry.

The cross-sections of the inner and outer electrodes may, for example, have a rectangular or other polygonal form, but preferably their forms are cylindrical and circular cross-sections and this will be assumed in the following description. It will also be assumed that each window has two opposite rectilinear edges parallel to the optical axis which edges subtend a solid angle greater than 90° at said axis.

The conductive extensions are electrically connected to the inner electrode and their inner surfaces may lie at radii which differ somewhat from the inner radius of the inner electrode (as measured from the optical axis). Preferably however, the extensions lie at the same radius since this permits the use of a lower potential difference for the same lens strength and also permits a maximum useful aperture for a given overall diameter.

A conductive extension may project a relatively short distance into the window area, or it may extend across the full axial length of a window in a direction parallel to the optical axis. In the latter event, the window will be a composite window since it will be subdivided into a plurality of parts by the presence of one or more such extensions.

An electrostatic lens as described above may be used in quadrature with an additional quadripole lens of the same, or different type to effect overall convergence of a beam in two orthogonal planes. In particular, a lens according to the invention of any of the forms described above may follow a similar lens, the two lenses being placed successively in the path of a beam on a common optical axis with their windows located in quadrature. In such an arrangement, the two lenses may have a common inner tubular electrode in which the two pairs of windows are formed in quadrature in regions spaced along the optical axis. The outer electrodes of the two lenses may also be formed as a single tubular element, but in some cases it may be desirable to have separate tubular elements so as to be able to apply different potentials to the separate outer electrodes.

Where a lens or an orthogonal pair of lenses as described is employed to focus the beam of a cathode-ray tube for television and like display purposes, the outer electrodes may be provided as a coating formed on the inner surface of the glass neck of the tube. The inner electrodes are supported, if desired, by the gun structure of the tube or form part of an anode of the gun. This arrangement is particularly advantageous since the outer electrode may be formed by the same process as the conductive coating normally provided inside the cone of a cathode-ray tube.

A further advantage of this last arrangement lies in the fact that the outer electrode can thus readily be given a low degree of conductivity as required to reduce eddy currents in cases where deflection coils are located outside the outer electrode. In some cases it is also desirable to minimize eddy current losses in the inner electrode. However, there are applications in which this problem does not arise, notably electron microscopes which do not employ any scanning action.

As will be appreciated, the polarity of the voltage applied between the electrodes determines the orientation of the lens action. Thus, apart from the question of correcting aberrations, it is possible to rotate the orientation of the lens action through 90° by reversing the polarity of the applied voltage.

A focusing system employing two lenses in quadrature as described above may conveniently be used with a conventional scanning system.

The invention will now be described by way of example, with reference to the drawing in which.

Figure 1:
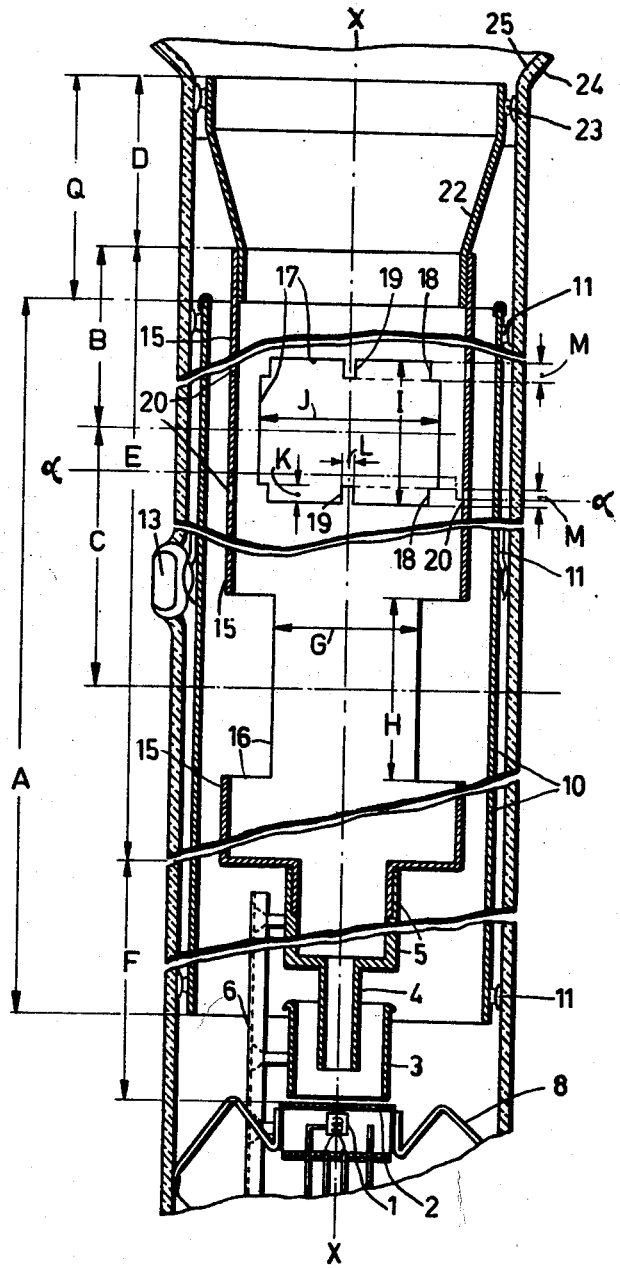
FIGURE 1 shows a longitudinal section of an electron gun structure with a quadripole lens embodying the improvements according to the invention.

The electron gun of FIGURE 1 has a focusing system comprising a rear lens with plain rectangular windows subtending angles greater than 90°, and a front lens in quadrature therewith in which the field configuration is improved by the provision of conductive extensions and auxiliary openings in accordance with further features of the invention.

Figure 2:
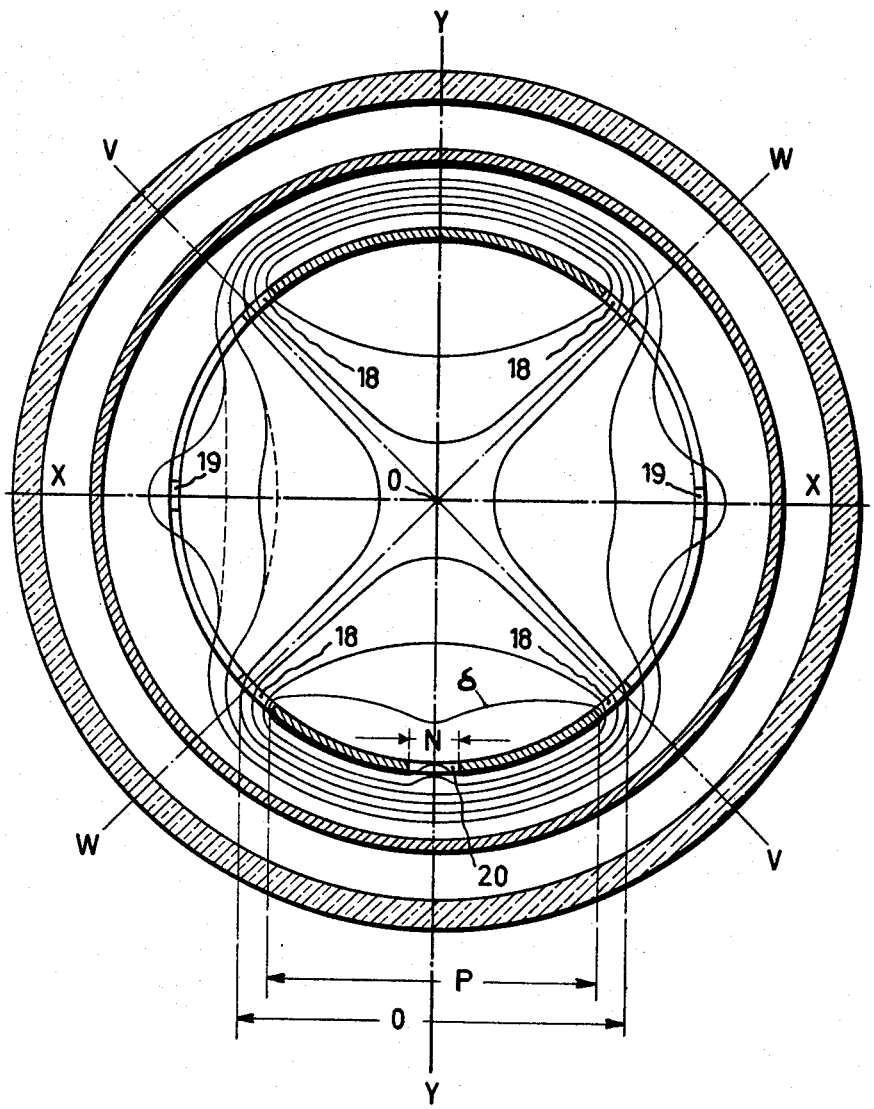
FIGURE 2 is an enlarged cross-section taken along the line a—a of FIGURE 1, and representing corrected field configurations.

In the arrangement of FIGURES 1 and 2, the electron gun has a cathode 1 followed by an intensity control electrode or "grid" 2 which in turn is followed by a spark trap electrode 3 held at the same potential as the cathode. The anode comprises a cylinder 4 of smaller diameter followed by a cylinder 5 of a larger diameter. All the aforesaid elements are carried by three insulating supports 6 and are centrally disposed within the neck 7 of the tube with the aid of centering springs 8.

The electrostatic focusing lenses have an outer electrode system comprising a cylindrical element of circular cross-section common to both lenses which is shown at 10 and is located centrally within the tube neck with the aid of springs 11. This element is connected to a contact shown at 13.

The inner electrodes of the two lenses employ a common element having two orthogonal pairs of windows. This element is a metal cylinder 15 of circular cross-section which is rigidly connected to, and forms part of, the anode 4, 5. The first pair of windows are of plain rectangular form as shown at 16 and are symmetrically disposed on either side of an axial plane X while being bisected by an axial plane Y. The second pair of windows are shown at 17 and are symmetrically disposed on either side of plane Y while being bisected by plane X. Windows 17 have a generally rectangular outline and are provided for correcting purposes with small inward steps 18 at the corners and two conductive extensions constituted by small axial projections 19 having axes coincident with the axis of each window. Further correcting means are provided in the form of four small rectangular auxiliary openings 20 located at equal distances from the windows 17. The first lens 16 does not have such correcting means since the beam is of small diameter at that point and is in a central part of the lens field which is more nearly perfect.

At its front end, the inner electrode 15 is electrically and rigidly connected to a conical metal element 22 which is centered by springs 23 and cooperates with the support 6 and springs 8 in maintaining the whole electrode system substantially co-axial with the tube neck. Part of the cone of the envelope is shown at 24. The cone 24 has an internal coating 25 of a conductive material, for example, "aquadag," and this coating overlaps the end of the element 22 (as shown) and is connected thereto so as to prevent the formation of a spherical lens field.

Suitable dimensions which may be used for the construction of FIGURES 1 and 2 are as follows:

*Table*

Distance of phosphor screen from cathode=280 mm.
Inner diameter of element 10=29 mm.
Outer diameter of element 15=25 mm.
Thickness of element 15=0.375 mm.
Dimension A=152.4 mm.
Dimension B=52.0 mm.
Dimension C=42.0 mm.
Dimension D=17 mm.
Dimension E=117 mm.
Dimension F=48.5 mm.
Dimension G=14.5 mm.
Dimension H=14.1 mm.
Dimension I=15 mm.
Dimension J=18 mm.
Dimension K=1.75 mm.
Dimension L=1 mm.
Dimension M=1.75 mm.
Dimension N=2 mm.
Dimension O=16.25 mm.
Dimension P=14.5 mm.
Dimension Q=22 mm.

If such dimensions are adopted suitable voltages are as follows. The cathode may be held at earth potential while the anode 4, 5 (together with the inner electrode system 15 and coating 25) are held at a potential of 18 kv. and the outer electrode system 10 of the lenses is held at about 10 kv.

If the openings 16, 17 are reduced in axial length, it is possible to focus the beam at the same distance with the outer cylinder held at a potential equal or close to that of the cathode instead of the 10 kv. potential mentioned above. This permits one of the high voltage supplies to be dispensed with and readily permits fine adjustment of the focusing to be carried out by applying a variable voltage between the outer cylinder 10 and the cathode.

The arrangement described provides a spot which is slightly elongated in one direction without, however being necessarily affected by astigmatism. For some applications this elongation of the spot is advantageous, but if the tube is employed in an application in which such elongation is disadvantageous, it can be eliminated by the addition of a third lens having the same orientation as the lens having the openings 16 (which will be referred to for brevity as lens 16) and located on the side of the lens 17 remote from the gun. The lens 16 will then be reduced in power and the additional lens will also have a power which is less than that of the lens 17. This system may be so arranged that the structure of lens 17 is left unchanged while the lens 16 and the additional lens are given such powers as to produce a focused spot having equal dimensions in the X and Y planes.

In the arrangement of FIGURE 1 deflection coils (not shown) can be located between the front edge of the openings 17 (i.e. the edge remote from the gun) and the beginning of the cone 24 of the envelope. In view of the eddy-current problem stated previously, it is desirable to reduce the conductivity of the outer cylinder 10 and inner electrode system 15, 22 (or at least the front part thereof). This may involve forming the outer cylinder 10 as a coating on the inner surface of a glass neck of correspondingly reduced diameter. Similarly, the inner electrode system 15, 22 may be formed from an insulating tube having an inner conductive coating with the openings 16, 17 cut out of the cylindrical wall. Alternatively, if the parts 10, 15 and 22 are made of metal which is not thin enough to prevent unduly large eddy currents, narrow longitudinal slits may be formed in the appropriate front parts of elements 10, 15 and 22, such slits being narrow enough to substantially prevent field penetration and being preferably extended to the front edge of element 22 so as to have open ends.

FIGURE 2 illustrates respectively the correcting effect of the projections 19 and ports 20 on the field configuration. FIGURE 2 shows the operative modification of an equipotential surface due to the presence of the projections 19 of FIGURE 1. Without these projections these equipotenital surfaces would have the form as indicated by the dotted lines. The peripheral dimension of the projection if small, is not critical and reduction of such dimension cannot reduce the correcting action below a minimum level.

FIGURE 2 also illustrates the effect of the ports 20 of FIGURE 1. In this case the operative modification of the field configuration is illustrated in the lower half by the parts of the equipotential surfaces.

By combining the two forms of correction as has been done in the construction of the figures, it is possible to obtain a lens field which is corrected for aberrations in such manner that the effective apertures of the lens is increased.

As will be appreciated, the diagonal axial planes V, and W of FIGURE 2 have central parts which are substantially coincident with central equipotential surfaces of the lens field. Such alignment of hyperbolic equipotential surfaces would occur in any case in a central region, but the extension of the windows beyond planes V–W permits the alignment to occur at greater distance from the optical axis O.

The corrections illustrated in FIGURES 1 and 2 are only applied along small fractions of the axial length of the lens 17 since no more is needed in the example given. However, there are applications in which it is desirable to use extensions and auxiliary openings which extend along the full axial length of the windows as aforementioned, so that correction is applied along the full axial length of the lens. A notable case is that in which the lens employs two slits in each of the conductive regions extending between the two windows which slits are situated nearer to the window edges than to each other, in combination with two bars in each window which bars are situated nearer to the window edges than to each other. Such an arrangement is capable of correcting all aberrations of octapole and 12-pole form and an example thereof will now be described with reference to FIGURES 3 and 4 of the drawings. Higher order aberrations (e.g. 16-pole and 24-pole) can also be corrected by the use of a greater number of bars (and an equal number of slits) and, since these aberrations occur mainly in the outer regions of the lens aperture, this would provide a larger useful aperture. However, the additional bars would greatly reduce field penetration thereby necessitating a greater axial length for the same lens strength. In the chosen case of two bars per window (and two slits at each side), the correction of the octapole and 12-pole aberrations will be sufficient for most purposes while at the same time permitting a much higher degree of field penetration than that allowed by four or more bars per window.

Figure 3:
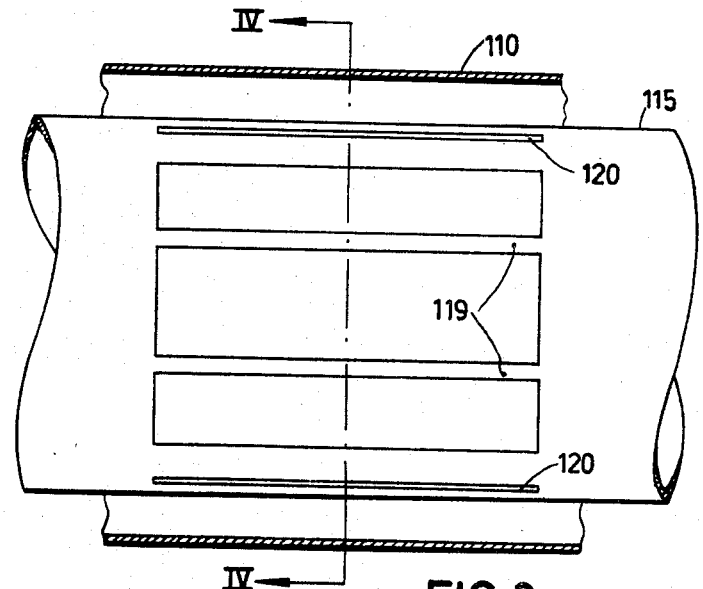
FIGURE 3 shows a further embodiment of a quadripole lens according to the invention and FIGURE 4 is a cross-section of the lens of FIGURE 3.
Figure 4:
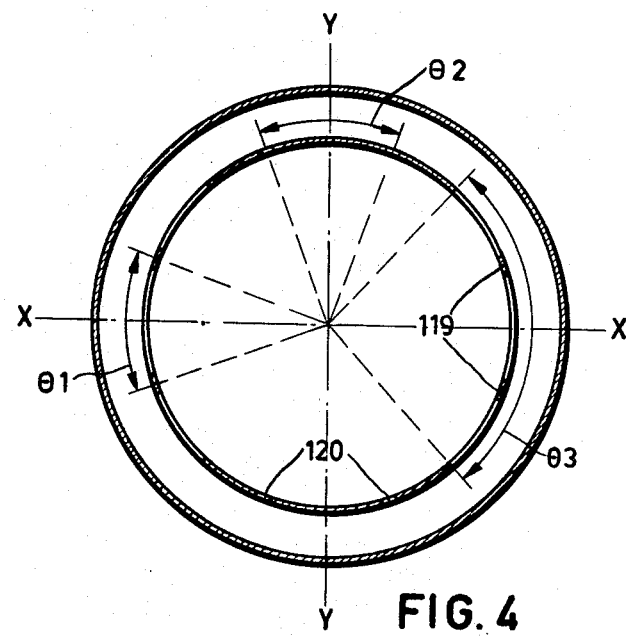

As shown in FIGURES 3 and 4, each window area is subdivided into three parts by the presence of the two correcting bars 119. The windows are formed as apertures in a metal cylinder 115 and the correcting slits 120 are formed in the same cylinder.

The main feature of the lens shown is the relative angular positioning of the bars 119 and slits 120, the diameter ratio between the inner and outer tubes being less critical. The relevant angles are as follows:

Angle $\theta_1$ between centres of bars=39.3°
Angle $\theta_2$ between centres of slits=39.7°
Angle $\theta_3$ subtended by windows=95°
Angle $\theta_3$ subtended by a bar 119=about 4.7°
Angle $\theta_3$ subtended by a slit 120= about 3.7°

In a practical example, the diameters of a lens having these angles may be as follows:

Inner diameter of outer tube = 31.0 mm.
Outer diameter of inner tube = 24.5 mm.
Thickness of inner tube = 0.375 mm.

The lens of FIGURES 3 and 4 may employ short correcting extensions and openings in addition to the bars 119 and slits 120. Such extensions and openings may be similar to those of the lens 17 of FIGURE 1.

A corrected lens as described with reference to FIGURES 3 and 4 may be used in quadrature with an additional lens similar to the lens 16 of FIGURE 1 located on the gun side thereof. Alternatively, such an additional lens may have the form of the front lens 17 of FIGURE 1 or the form shown in FIGURES 3 and 4. In a particular case, a lens as described with reference to FIGURES 3 and 4 can replace the front lens 17 of the tube of FIGURE 1, subject to appropriate minor changes in the dimensions given and an appropriate increase in the axial length of the windows to compensate for the reduction in field penetration due to the bars 119.

The lenses illustrated may readily be adapted for use in an electron microscope.

In the examples illustrated it has been assumed that the conductive extensions and auxiliary openings were used for correcting the aberrations of the lens of which they formed part. However, there are circumstances in which the said extensions and openings may be used to effect a correction such as to introduce a predetermined aberration into the lens for the purpose of compensating for an aberration appearing in another lens of the optical system.

What is claimed is:

1. A quadripole electrostatic lens system adapted to focus a beam of electrically charged particles along a given axis, comprising a tubular inner conductive member longitudinally disposed about said beam and having a pair of windows formed in regions thereof which are diametrically disposed relative to the beam axis, field configuration modifying means comprising conductive elements projecting from said inner member into the window areas along axes substantially parallel to said beam axis, an outer conductive member coaxial with and longitudinally disposed about said inner member and having operative conductive elements arranged substantially in juxtaposition to and covering said windows and said field modifying means, and means for establishing a potential difference between said inner and outer conductive members.

2. Apparatus as in claim 1 wherein said field modifying means further comprises auxiliary openings symmetrically located in said inner conductive member in the area extending between said windows.

3. An electrostatic lens system adapted to focus a beam of electrically charged particles along a given axis comprising a hollow inner conductive member longitudinally disposed about said beam and having a pair of windows formed in regions thereof which are diametrically disposed relative to the beam axis, field modifying means comprising conductive elements electrically connected to said inner member and extending into the window areas along axes substantially parallel to the beam axis, an outer conductive member having operative conductive elements arranged to cover said windows and said field modifying means, and means for establishing a potential difference between said inner and outer conductive members.

4. An electrostatic lens system adapted to focus a beam of electrically charged particles along a given axis comprising a hollow inner cylindrical conductive member longitudinally disposed about said beam and having a pair of windows formed in opposite regions thereof which are symmetrically disposed on either side of a first axial plane including said beam axis, each of said windows being divided symmetrically into two equal parts by a second axial plane normal to said first plane, field modifying means comprising conductive elements extending into the window areas along axes substantially parallel to the beam axis and further including auxiliary openings symmetrically located with respect to both of said axial planes in said inner conductive member in the area extending between said windows, an outer cylindrical conductive member coaxial with and longitudinally disposed about said inner member and having operative conductive elements arranged to cover said windows and said field modifying means, and means for establishing a potential difference between said inner and outer conductive members.

5. In a cathode ray tube system including an electron gun having an anode, a quadripole electrostatic lens system adapted to focus a beam of electrically charged particles along a given axis comprising a hollow inner cylindrical conductive member forming part of said anode and longitudinally disposed about said beam and having a pair of windows formed in opposite regions thereof diametrically disposed relative to the beam axis, field modifying means comprising first and second conductive bars in each window which extend across the full axial length of said windows substantially parallel to the beam axis and located closer to the edges of the window than to each other, said field modifying means further comprising first and second elongated apertures extending parallel to the beam axis along the full axial length of the windows and disposed in each of the conductive regions of said inner member between the two windows, each of said apertures being located closer to a window edge than to each other, an outer conductive member having operative inner surfaces lying on a second cylindrical surface coaxial with said inner cylindrical member, said operative surfaces of said outer conductive member arranged to substantially cover said windows and said elongated apertures, and means for establishing a potential difference between said inner and outer conductive members.

6. A cathode ray tube system of the type having means for producing an electron beam and a quadripole electrostatic lens structure, said system comprising a tubular inner electrode longitudinally disposed about the electron beam and having a pair of windows in opposite regions thereof symmetrically disposed on opposite sides of an axial plane, said windows each having two straight edges substantially parallel to the beam axis and subtending an angle greater than 90° at the beam axis, field modifying means comprising conductive elements integral with said inner electrode and extending into the window areas along axes substantially parallel to the beam axis and auxiliary openings in the parts of the inner electrode extending between the windows, said conductive elements and said auxiliary openings being symmetrically disposed with respect to the axial plane, and an outer electrode having operative elements which cover said window areas and said auxiliary openings.

7. A cathode ray tube system including means for producing an electron beam and a quadripole electrostatic lens structure, comprising a tubular conductive inner electrode having a pair of windows formed in opposite regions thereof and symmetrically disposed on opposite sides of a first axial plane, each of said windows being symmetrically divided by a second axial plane normal to said first plane, said inner electrode including conductive elements extending into the window areas along axes substantially parallel to the beam axis and auxiliary openings in the parts of the inner electrode extending between the windows, said conductive elements and auxiliary openings being symmetrically disposed relative to said first and second axial planes, and an outer conductive electrode having operative conductive elements which cover said windows and said auxiliary openings.

8. Apparatus according to claim 7, wherein said conductive elements comprise bars extending across the full axial length of the windows in a direction substantially parallel to the beam axis.

9. Apparatus according to claim 7, wherein said auxiliary openings comprise elongated apertures extending substantially along the full axial length of the windows in a direction substantially parallel to the beam axis.

10. An electrostatic lens system adapted to focus a beam of electrically charged particles, comprising first and second tubular inner electrodes longitudinally disposed about said beam, each of said inner electrodes having a pair of windows formed in regions thereof diametrically opposite the beam axis, the windows of one pair being arranged substantially in quadrature with those of the other pair, field modifying means integral with one of said inner electrodes comprising conductive elements extending into the window areas along axes substantially parallel to the beam axis and further including auxiliary openings symmetrically located in said inner electrode in the area extending between said windows, and an outer electrode having operative elements which substantially cover said windows and said field modifying means.

11. An electrostatic lens system adapted to focus a beam of electrically charged particles, comprising first and second hollow conductive members longitudinally disposed about said beam and coaxial therewith, the first member being coaxially disposed within the second member and having two discrete pairs of windows axially and symmetrically disposed therein, the windows of one pair being shifted circumferentially about the axis substantially 90° relative to the other pair of windows, field modifying means integral with said first member comprising conductive elements extending into the window areas of one pair of windows along axes substantially parallel to the beam axis and further including auxiliary openings symmetrically located in said first member in the area extending between one pair of windows, said second member having operative conductive elements which substantially cover said windows and said field modifying means, and means for establishing a potential difference between said first and second conductive members.

References Cited in the file of this patent
UNITED STATES PATENTS

| | | |
|---|---|---|
| 2,844,753 | Quate | July 22, 1958 |
| 3,069,588 | Skowron et al. | Dec. 18, 1962 |